(12) United States Patent
Bourven

(10) Patent No.: US 11,091,062 B2
(45) Date of Patent: Aug. 17, 2021

(54) SLIDE RAIL FOR VEHICLE SEAT AND VEHICLE SEAT COMPRISING SUCH A SLIDE RAIL

(71) Applicant: FAURECIA Sièges d'Automobile, Nanterre (FR)

(72) Inventor: Yves Bourven, Thury-Harcourt (FR)

(73) Assignee: FAURECIA Sièges d'Automobile, Nanterre (FR)

(*) Notice: Subject to any disclaimer, the term of this patent is extended or adjusted under 35 U.S.C. 154(b) by 82 days.

(21) Appl. No.: 16/568,748

(22) Filed: Sep. 12, 2019

(65) Prior Publication Data
US 2020/0094711 A1    Mar. 26, 2020

(30) Foreign Application Priority Data

Sep. 21, 2018    (FR) .................................... 18 58601

(51) Int. Cl.
*B60N 2/07*    (2006.01)
*B60N 2/08*    (2006.01)

(52) U.S. Cl.
CPC ......... *B60N 2/0818* (2013.01); *B60N 2/0705* (2013.01)

(58) Field of Classification Search
CPC ............................ B60N 2/0705; B60N 2/0727
See application file for complete search history.

(56) References Cited

U.S. PATENT DOCUMENTS

| | | | | |
|---|---|---|---|---|
| 9,834,116 B2* | 12/2017 | Couasnon | ............ | B60N 2/0732 |
| 2013/0200243 A1* | 8/2013 | Mischer | ............... | B60N 2/0705 |
| | | | | 248/429 |
| 2014/0224955 A1 | 8/2014 | Nagura | | |
| 2016/0144746 A1 | 5/2016 | Couasnon | | |
| 2018/0222352 A1 | 8/2018 | Flick | | |

FOREIGN PATENT DOCUMENTS

| | | |
|---|---|---|
| FR | 2969967 A1 | 7/2012 |
| FR | 3032657 A1 | 8/2016 |
| WO | 2017021383 A1 | 2/2017 |
| WO | 2017086539 A1 | 5/2017 |

OTHER PUBLICATIONS

Search Report for French App. No. 1858601 dated Jul. 18, 2019, BET190315 FR, 9 pages, no English translation available.

\* cited by examiner

*Primary Examiner* — Sarah B McPartlin
(74) *Attorney, Agent, or Firm* — Barnes & Thornburg LLP

(57) ABSTRACT

A slide rail for a vehicle seat, comprising first and second slidably mounted profiles and a latch. Each of the first and second profiles has a web and two side flanges. The side flanges of the second profile are extended further towards one another by two re-entrant troughs themselves extended further towards the web of the second profile by downward edges. The side flanges of the first profile are extended further away from each other by flaps which pass between the downward edges and the web of the second profile. The web of the second profile comprises rigid abutments arranged facing the downward edges, the flaps of the first profile passing between the abutments and the downward edges.

14 Claims, 4 Drawing Sheets

SLIDE RAIL FOR VEHICLE SEAT AND VEHICLE SEAT COMPRISING SUCH A SLIDE RAIL

PRIORITY CLAIM

This application claims priority to French Patent Application No. 18 58601, filed Sep. 21, 2019, which is expressly incorporated by reference herein.

BACKGROUND

The present disclosure relates to rails, and particularly to slide rails. More particularly, the present disclosure relates to vehicle seat comprising such slide rails.

SUMMARY

According to the present disclosure, a vehicle seat comprises slide rails. The slide rail for a vehicle seat comprises first and second profiles mounted so as to slide relative to one another in a longitudinal direction.

In illustrative embodiments, the slide rail further includes a latch movable between a locked position where said latch immobilizes the first and second profiles relative to one another and an unlocked position where said latch allows the first and second profiles to slide relative to one another.

In illustrative embodiments, each of the first and second profiles having a web and two side flanges, the side flanges of the second profile extending towards the web of the first profile in a second direction perpendicular to the longitudinal direction, one on either side of the side flanges of the first profile.

In illustrative embodiments, said side flanges of the second profile respectively extended further towards one another by two re-entrant troughs themselves respectively extended further towards the web of the second profile, in said second direction, by downward edges.

In illustrative embodiments, said side flanges of the first profile extended further away from one another by flaps which pass respectively between the downward edges and the web of the second profile.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the different figures, the same references designate identical or similar elements.

In the following description, spatial positioning indications such as top, bottom, upper, lower, horizontal, vertical, etc. are given for the sake of clarity, based on the usual position of use of the slide rail and seat, but are not limiting.

Figure 1:
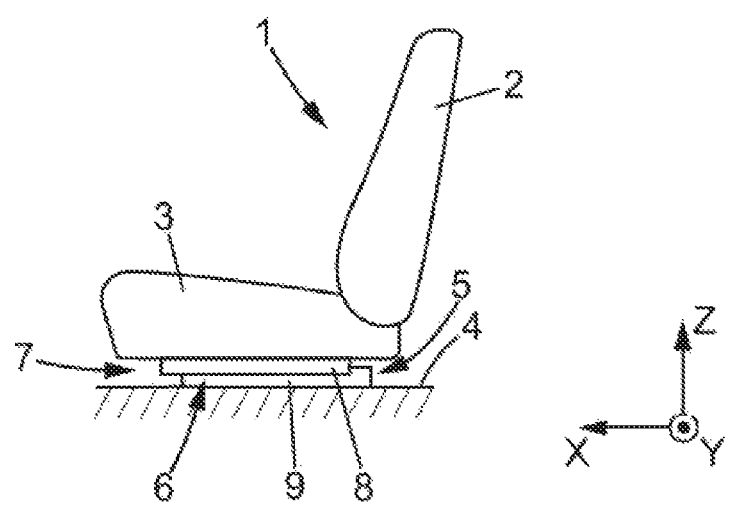
FIG. 1 is a schematic view of a seat that can be equipped with a set of slide rails according to the present disclosure.

FIG. 1 represents a motor vehicle seat 1 which comprises a backrest 2 mounted on a seating portion 3. The seating portion 3 is fixed to the floor 4 of the vehicle by means of a set of slide rails 5 which allows the seat 1 to slide on the floor 4 in a horizontal longitudinal direction X.

Figure 2:
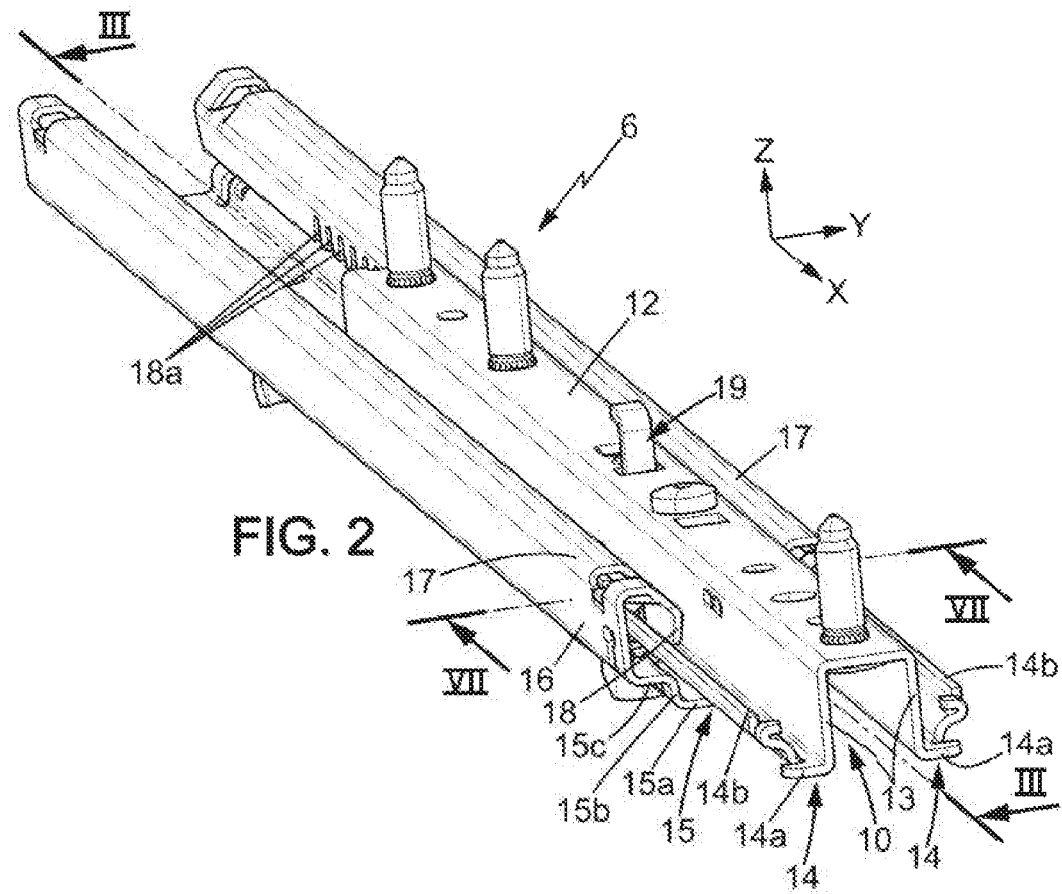
FIG. 2 is a perspective view of one of the slide rails supporting the seating portion of the seat of FIG. 1, in one embodiment of the present disclosure.
Figure 3:
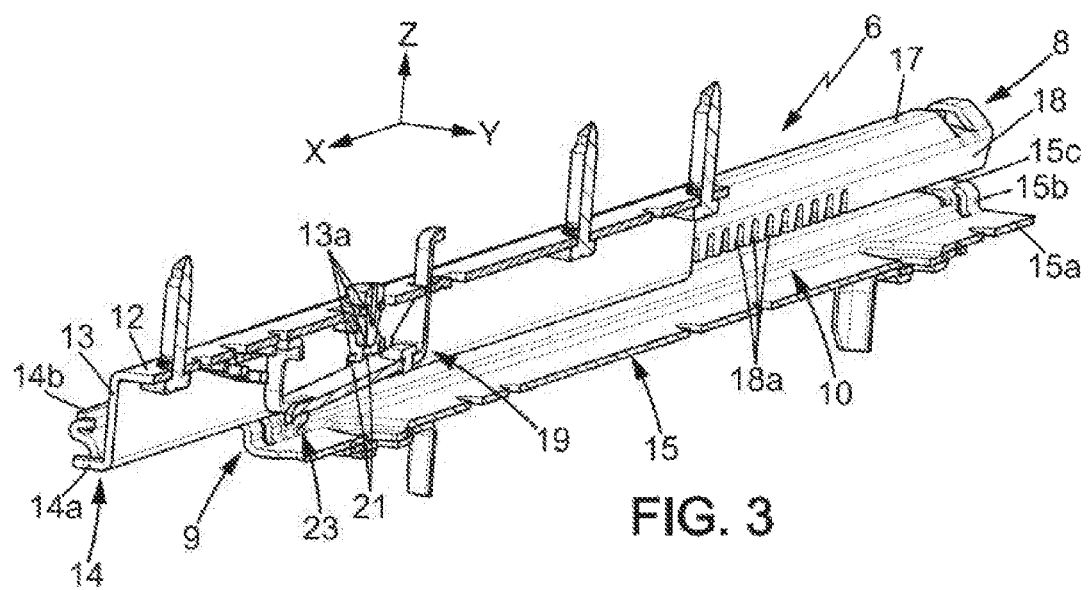
FIG. 3 is a perspective sectional view of the slide rail of FIG. 2, the sectional view being along line III-III of FIG. 2.
Figure 4:
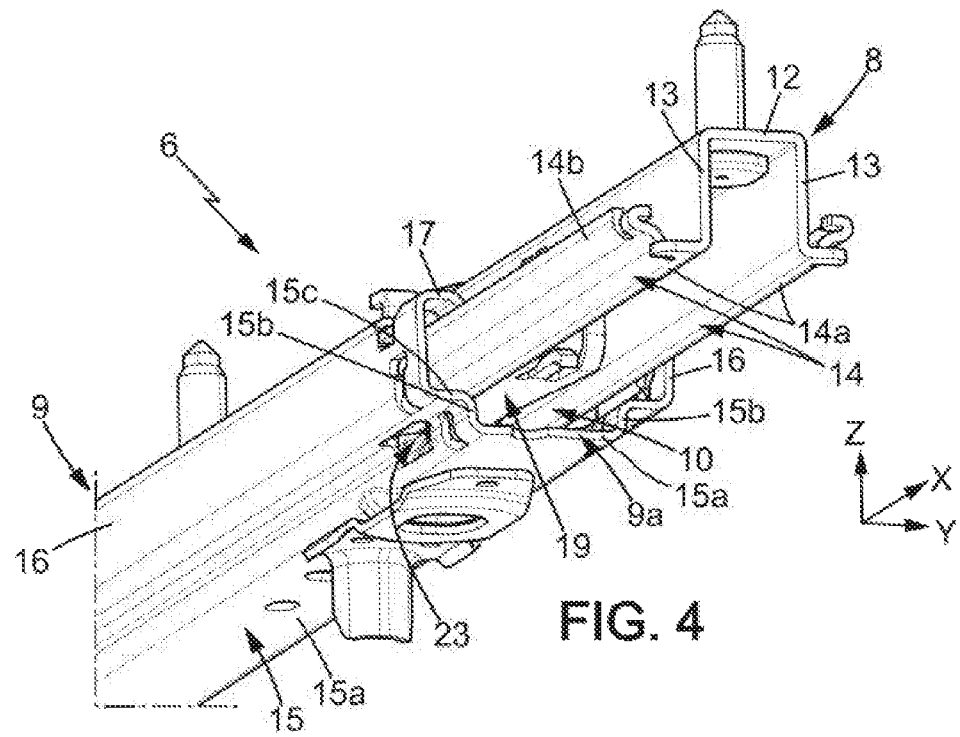
FIG. 4 is a three-quarter perspective view from below, of the front end of the slide rail of FIG. 2.

The set of slide rails 5 includes two parallel slide rails 6, of which one is clearly visible in FIG. 2, comprises two parallel slide rails 6 extending in the longitudinal direction X, and an actuating member 7 common to the two slide rails 6, for example in the form of a release lever having a general U-shape.

Each of the slide rails 6 comprises a first metal profile 8 which carries the seating portion 3 and which is mounted so as to slide in the longitudinal direction X on a second metal profile 9 fixed to the floor 4.

As shown in particular in FIGS. 2 to 7, the first and second profiles 8, 9 are for example nested one inside the other while defining a hollow interior space 10. The first profile 8 may for example be a male profile and the second profile 9 a female profile.

The first profile 8 may have a substantially U-shaped cross-section, comprising a horizontal upper web 12 fixed to the seating portion 3 of the seat, and two side flanges 13 which each extend substantially in a downwards vertical direction Z from the horizontal web 12. The web 12 may extend in a plane XY, where Y is a transverse direction perpendicular to directions X, Z, but this configuration is not mandatory: the web 12 may for example extend at an angle.

Each side flange 13 is further extended outward by a flap 14, comprising an intermediate portion 14a extending horizontally outward from the lower end of the side flange 13 and a substantially vertical terminal portion extending upward from the intermediate portion.

The second profile 9 may also have a U-shaped cross-section, with a horizontal lower web 15 fixed to the floor 4 of the vehicle and extending parallel to the upper web 12 of the first profile 8, and two side flanges 16 which each extend substantially vertically upwards from the lower web 15, externally to the flaps 14 of the first profile 8.

The lower web 15 may extend in a plane XY, where Y is a transverse direction perpendicular to directions X, Z, but this configuration is not mandatory: the lower web 15 may for example extend at an angle.

The side flanges 16 of the second profile 9 may respectively form re-entrant troughs 17 respectively having substantially vertical downward terminal walls 18, which extend downwards along the side flanges 13 of the first profile 8 and are external to said side flanges 13, the end portions 14b of the flaps 14 of the first profile 8 being arranged inside said re-entrant troughs 17, between each downward wall 18 and the corresponding side flange 16 of the second profile 9.

The lower web 15 of the second profile 9 may comprise a bottom 15a and two side projections 15b, 15c respectively facing the flaps 14 of the first profile 8. More particularly, said side projections 15b, 15c may respectively comprise two upward walls 15b extending in the Z direction away from the bottom 15a and two side flanges 15c extending away from one another starting from the upward walls 15b and in the transverse direction Y.

The downward terminal walls 18 may be provided, at their lower end, with indentations 18a arranged regularly along the X direction at a constant pitch. These indentations 18a are adapted to receive the teeth 21 of a latch 19 when the latch is in the high locking position and immobilizes the first profile 8.

The teeth 21 of the latch 19 can be vertically movable in vertical slots 13a formed in the side flanges 13, between the high locked position visible in the figures and a low unlocked position where the teeth 21 of the latch 19 exit the indentations 18a and allow the sliding of the first profile 8 on the second profile 9 in the longitudinal direction X.

The latch 19 is carried by the first profile 8 and is elastically biased towards the locking position. In the example shown, the latch 19 comprises an elastic blade 20 which carries the teeth 21 and which elastically biases the teeth 21 towards the locking position, the elastic blade 20 being elastically deformable towards the unlocking position, in particular due to the action of the release lever 7, in a manner known per se.

Figure 7:
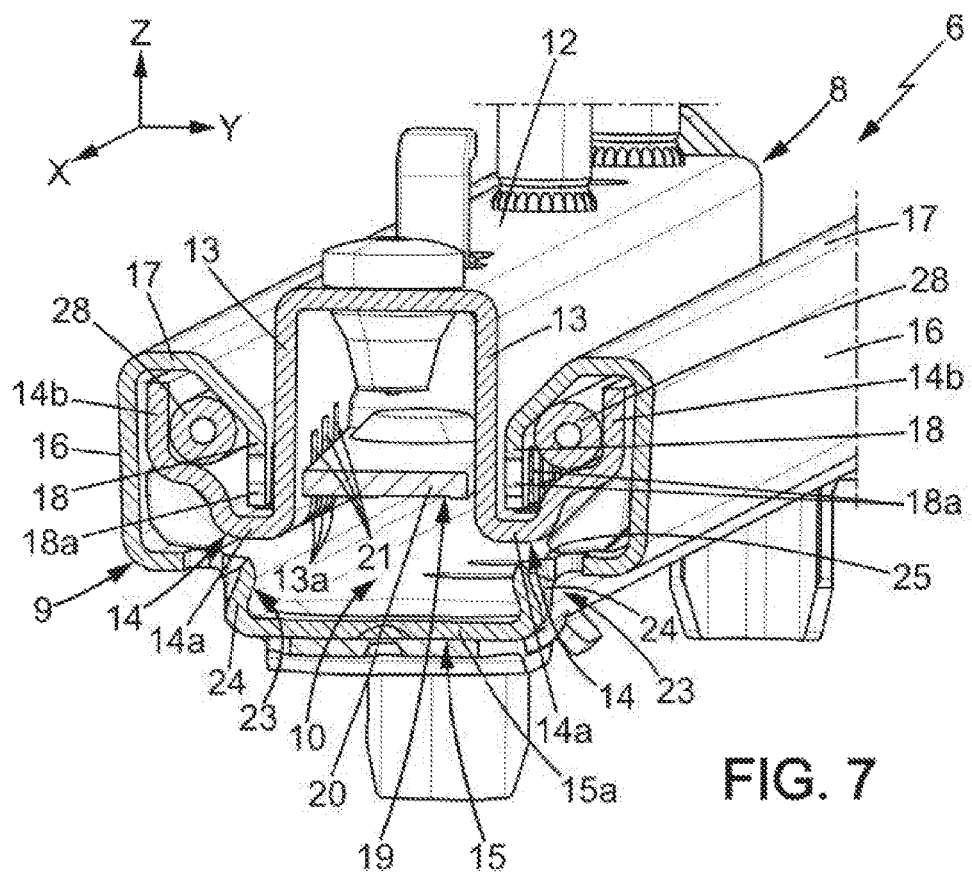
FIG. 7 is a cross-sectional view along line VII-VII of FIG. 2.

Between the profiles 8 and 9 there are interposed balls 27 or rollers, in a manner known per se, in particular between the flaps 14 and the downward walls 18 on the one hand and between the flaps 14 and the flanges 15c on the other. The balls 27 can be kept apart from each other by spacers 28 (FIG. 7).

Figure 5:
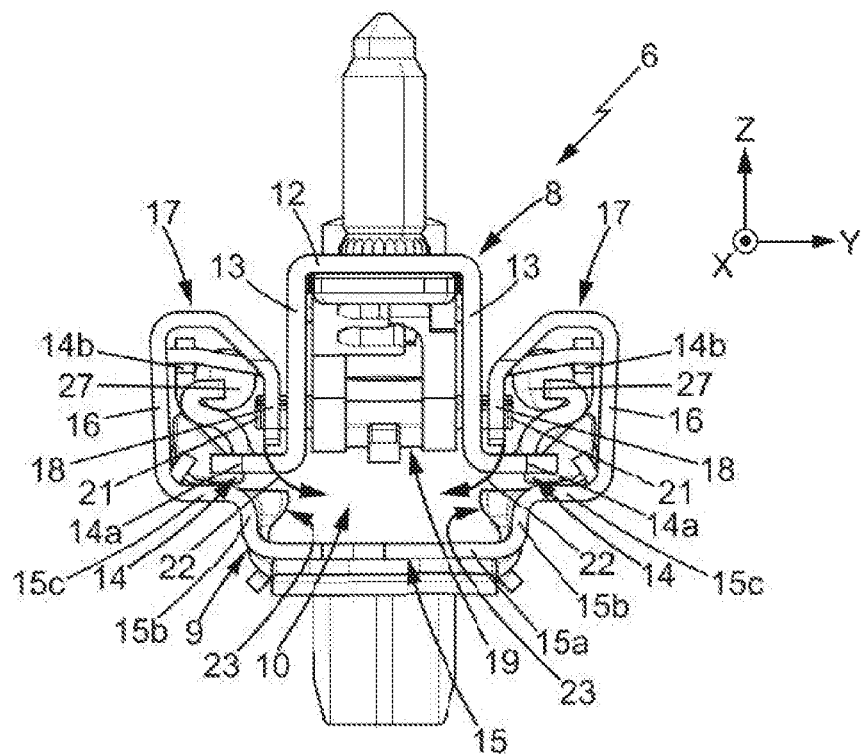
FIG. 5 is an end-on view of the slide rail of FIG. 2.

When the vehicle in which the seat 1 is installed is subjected to a very violent impact, in particular a frontal impact, the first profile 8 can have a tendency to disengage from the second profile 9, the lower ends of the side flanges 13 and the flaps 14 tending to deform by drawing closer to each other as indicated by the arrows 22 visible in FIG. 5.

Such deformation is minimized here by the presence of rigid abutments 23 integral to the second profile 9 and arranged in mutually corresponding positions (in other words at the same position along the longitudinal direction X) under the flaps 14. The abutments 23 may be formed in particular in proximity to the front end 9a of the second profiles 9 (see FIG. 4). In particular, the abutments 23 may be formed at a distance of between 10 mm and 50 mm from the front end 9a of the second profiles 9.

More specifically, the abutments 23 may be part of the web 15 of the second profile 9, and said abutments 23 may be arranged facing said downward edges 18, the intermediate portions 14a of the flaps 14 passing between said abutments 23 and said downward edges 18.

The abutments 23 may be formed by creating drawn shapes in the web 15 of the second profile 9 and in particular in said side projections 15b, 15c.

Figure 6:
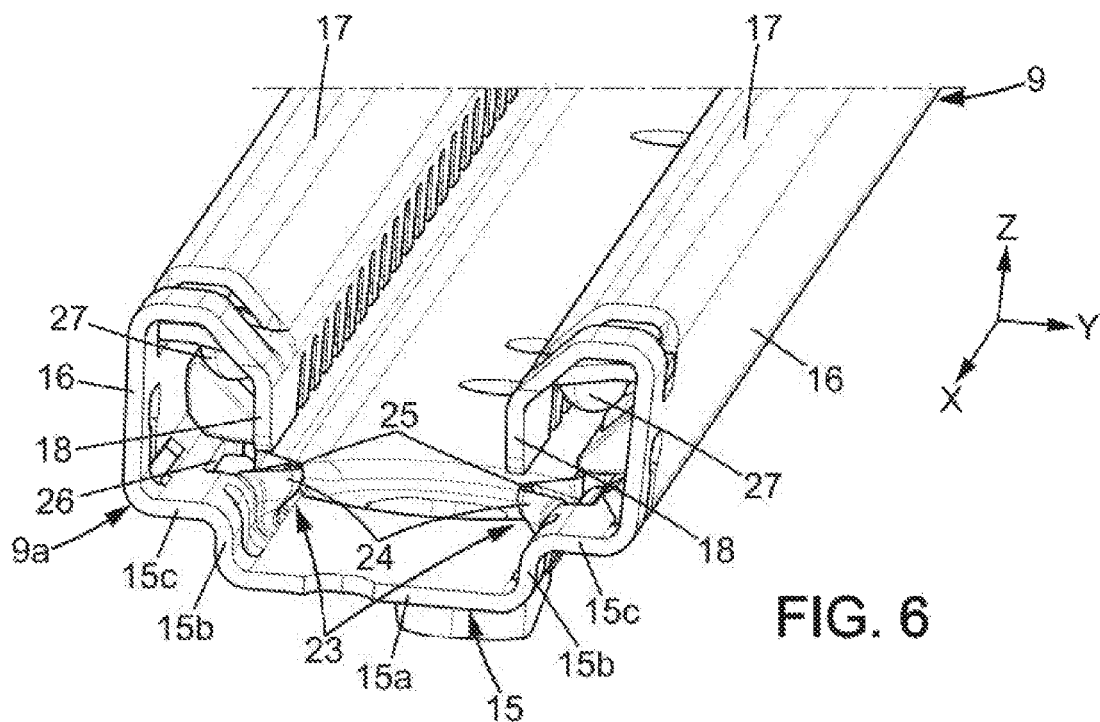
FIG. 6 is a perspective view of the front end of the second profile of the slide rail of FIG. 2.

More particularly, said abutments 23 may be formed by drawn shapes created at least in the upward walls 15b of the side projections and protruding towards one another from said upward walls 15b. The drawn shapes in question may have cutouts, the abutments 23 each having a curved wall 24 integral with the corresponding upward wall 15b, said curved wall 24 having a curved edge 25 which extends substantially in the plane XY facing the flap 14 of the first profile 8. The vertical clearance between said curved edge 25 and the flap 14 is small, for example 1 to 2 mm. The creation of the cutout leaves an opening 26 in the web 15 of the second profile 9, more particularly in the side flanges 15c (FIG. 6). Where appropriate, the slide rail 6 could have only one abutment 23.

The present description is intended in particular to further improve slide rails to increase their mechanical strength. Reference is hereby made to French Patent Application FR2969967 for disclosure relating to slide rails, which application is hereby incorporated in its entirety herein.

For this purpose, the web of the second profile comprises at least one rigid abutment arranged facing at least one of said downward edges, at least one of the flaps of the first profile passing between said at least one abutment and said corresponding downward edge.

With these arrangements, said at least one abutment prevents the first profile from disengaging from the second profile in the event of an impact to the vehicle.

Said at least one abutment is adapted to block the first profile from disengaging from the second profile, in the event of an impact to the vehicle, by deformation of the lower ends of the side flanges and of the flaps by drawing closer to one another.

In various embodiments, one or more of the following may also be used:

said at least one abutment is formed by a drawn shape created in the web of the second profile;

the web of the second profile comprises a bottom and two side projections respectively facing the flaps of the first profile, and said at least one abutment is formed by a drawn shape created in one of said side projections;

said side projections respectively comprise two upward walls extending in the second direction away from the bottom and two side flanges extending away from one another from the upward walls, said at least one abutment being formed by a drawn shape created in at least in one of said upward walls and projecting towards the other of said upward walls;

said drawn shape has a cutout, said at least one abutment comprising a curved wall formed integrally with the corresponding upward wall, said curved wall having a curved edge extending substantially in a plane perpendicular to the second direction while facing the flap of the first profile;

the slide rail comprises two abutments arranged in mutually corresponding positions;

the flaps respectively comprise two intermediate portions extending away from one another substantially perpendicular to the second direction and two end portions further extending said intermediate portions between the side flanges and the downward edges of the second profile; and the downward edges of the second profile comprise indentations with which the teeth of the latch engage when in the locked position.

The present disclosure also relates to a vehicle seat comprising at least one slide rail as defined above, a backrest, and a seating portion fixed to the first profile of said slide rail. The second profile of the slide rail may comprise a front end located opposite to the backrest, said at least one abutment being arranged in proximity to said front end.

The invention claimed is:

1. A slide rail for a vehicle seat, the slide rail comprising:
    first and second profiles mounted so as to slide relative to one another in a longitudinal direction,
    a latch movable between a locked position where said latch immobilizes the first and second profiles relative to one another, and an unlocked position where said latch allows the first and second profiles to slide relative to one another,
    each of the first and second profiles having a web and two side flanges, the side flanges of the second profile extending towards the web of the first profile in a second direction perpendicular to the longitudinal direction, one on either side of the side flanges of the first profile,
    said side flanges of the second profile being respectively extended further towards one another by two re-entrant troughs themselves respectively extended further towards the web of the second profile, in said second direction, by downward edges, said side flanges of the first profile being extended further away from one another by flaps which pass respectively between the downward edges and the web of the second profile, wherein the web of the second profile comprises at least one rigid abutment arranged facing at least one of said downward edges, at least one of the flaps of the first profile passing between said at least one abutment and said corresponding downward edge, and wherein said at least one abutment is adapted to prevent the first profile from disengaging from the second profile, in the event of an impact to the vehicle, by deformation of the lower ends of the side flanges and of the flaps of the first profile toward one another.

2. The slide rail of claim 1, wherein said at least one abutment is formed by a drawn shape created in the web of the second profile.

3. The slide rail of claim 2, wherein the web of the second profile comprises a bottom and two side projections respectively facing the flaps of the first profile, and said drawn shape is created in one of said side projections.

4. The slide rail of claim 3, wherein said side projections respectively comprise two upward walls extending in the second direction away from the bottom and two side flanges extending away from one another from the upward walls, said at least one abutment being formed by a drawn shape created in at least one of said upward walls and projecting towards the other of said upward walls.

5. The slide rail of claim 3, wherein said drawn shape has a cutout, said at least one abutment comprising a curved wall formed integrally with the corresponding upward wall, said curved wall having a curved edge extending substantially in a plane perpendicular to the second direction while facing the flap of the first profile.

6. The slide rail of claim 5, wherein said curved edge is an upper edge of said at least one abutment.

7. The slide rail of claim 1, wherein said at least one abutment comprises two abutments arranged in mutually corresponding positions.

8. The slide rail of claim 1, wherein the flaps respectively comprise two intermediate portions extending away from one another substantially perpendicular to the second direction and two terminal portions further extending from said intermediate portions between the side flanges and the downward edges of the second profile.

9. The slide rail of claim 1, wherein the downward edges of the second profile comprise indentations with which teeth of the latch engage when in the locked position.

10. A vehicle seat comprising at least one slide rail according to claim 1, a backrest, and a seating portion fixed to the first profile of said slide rail.

11. The vehicle seat of claim 10, wherein the second profile of the slide rail comprises a front end located opposite to the backrest, said at least one abutment being arranged in proximity to said front end.

12. The slide rail of claim 1, wherein said at least one abutment is spaced apart from said first profile until the impact to the vehicle.

13. The slide rail of claim 1, wherein said second profile has a first end and a second end, wherein said second profile further includes a stop located between the first end and the second end, and wherein said at least one abutment is located between the stop and the second end.

14. The slide rail of claim 1, wherein the web of the second profile comprises a bottom and two side projections, said side projections including an upward wall extending toward the flap of the first profile and a side flange extending outward from the upward wall, said at least one abutment has a curved upper surface located at or below an upper surface of said side flange relative to the second direction such that the flap of the first profile is spaced apart from said side flange and said at least one abutment.

* * * * *